United States Patent
Beal et al.

(10) Patent No.: US 6,237,008 B1
(45) Date of Patent: May 22, 2001

(54) SYSTEM AND METHOD FOR ENABLING PAIR-PAIR REMOTE COPY STORAGE VOLUMES TO MIRROR DATA IN ANOTHER STORAGE VOLUME

(75) Inventors: David Grant Beal, Longmont; Michael Steven Milillo, Louisville; Christopher James West, Boulder, all of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/119,124

(22) Filed: Jul. 20, 1998

(51) Int. Cl.[7] .................................................. G06F 12/00
(52) U.S. Cl. .......................................... 707/204; 711/162
(58) Field of Search ................................... 711/162, 161, 711/165, 111, 114, 112, 202; 714/5, 6, 718, 763, 710, 13; 709/219; 710/6; 707/204, 202

(56) References Cited

U.S. PATENT DOCUMENTS

| | | |
|---|---|---|
| 4,979,108 | 12/1990 | Crabbe, Jr. . |
| 5,155,845 * | 10/1992 | Beal et al. ................................ 714/6 |
| 5,446,871 | 8/1995 | Shomler et al. . |
| 5,504,861 | 4/1996 | Crockett et al. . |
| 5,544,347 * | 8/1996 | Yanai et al. ........................... 711/162 |
| 5,592,618 | 1/1997 | Micka et al. . |
| 5,615,329 | 3/1997 | Kern et al. . |
| 5,623,599 | 4/1997 | Shomler . |
| 5,742,792 * | 4/1998 | Yanai et al. ........................... 711/162 |
| 5,835,954 * | 11/1998 | Duyanovich et al. ................ 711/162 |
| 5,857,208 * | 1/1999 | Ofek ...................................... 707/204 |
| 5,933,653 * | 8/1999 | Ofek ......................................... 710/6 |
| 5,987,566 * | 11/1999 | Vishlitzky et al. ................... 711/114 |
| 6,044,444 * | 3/2000 | Ofek ...................................... 711/162 |
| 6,052,797 * | 4/2000 | Ofek et al. ............................... 714/6 |
| 6,065,018 * | 5/2000 | Beier et al. ............................ 707/202 |
| 6,073,221 * | 6/2000 | Beal et al. ............................. 711/162 |
| 6,073,222 * | 6/2000 | Ohran .................................. 711/162 |

OTHER PUBLICATIONS

IBM Technical Discosure Bulletin, vol. 38, No. 09, Sep. 1995 pp. 95–98, "Management of Peer–to–Peer Control Unit Paths".

* cited by examiner

Primary Examiner—John A. Follansbee
(74) Attorney, Agent, or Firm—Noreen Krall, Esq.; Ohlandt, Greeley, Ruggiero & Perle, LLP

(57) ABSTRACT

A data storage system includes at least first, second and third virtual storage volumes, the second and third virtual storage volumes being remotely coupled as a PPRC pair to enable a mirroring of data therebetween. The storage system is responsive to a snapshot command from a host processor, to cause transfer of the directory of the first virtual storage volume to the second virtual storage volume. The storage system then invokes a PPRC mirroring procedure which (i) detects an unsynchronized condition between the second and third virtual storage volumes (upon transfer of the directory from the first virtual storage volume to the second virtual storage volume), and (ii) causes a transfer of data, pointed to by the transferred directory, to the third virtual storage volume, until the second and third virtual storage volumes are again in synchronism. This action achieves a synchronization of the first and third virtual storage volumes, while the first virtual storage volume is relieved from certain processing overhead incident to transfer of data to the remotely located third virtual storage volume.

12 Claims, 3 Drawing Sheets

SYSTEM AND METHOD FOR ENABLING PAIR-PAIR REMOTE COPY STORAGE VOLUMES TO MIRROR DATA IN ANOTHER STORAGE VOLUME

RELATED APPLICATION

This Application is related to U.S. patent application Ser. No. 09/119,114 entitled "System and Method for Enabling Pair-Pair Remote Copy Storage Volumes to Mirror Data in Another Pair of Storage Volume" to Beal et al.

FIELD OF THE INVENTION

This invention relates to systems wherein data storage devices maintain shared copies of data and, more particularly, to a system and method for creating a snapshot of a virtual storage volume through use of a remote copy procedure present in one of a pair to pair remote copy virtual storage volumes.

BACKGROUND OF THE ART

The typical digital computer system includes one or more disk subsystems for storing both data and instructions. Disks within the disk subsystems are divided into a plurality of tracks, at selected radial distances from the center and sectors which define particular angular regions in each track. When plural disks are present in a disk system, identically positioned tracks on each disk are handled as a volume (or cylinder).

Since stored data may be corrupted or destroyed, backup systems have been developed to create multiple copies of the stored data, usually on separate disk drives so that in such an event, the data can be recovered from one or more of the copies. Such provision of copies is referred to as either "shadowing" or "mirroring" of the data. When such mirroring is carried on between a pair of remotely located disk volumes, those disk volumes are referred to as a "peer to peer remote copy" (PPRC) pair.

While a PPRC pair may create mirrored copies at discrete intervals, many PPRC pairs now mirror their data on a continuing basis so as to maintain their respective data copies in synchronism. While such backup copying techniques are frequently used, they are expensive in terms of required processing time, especially when the virtual storage volume system stores large amounts of data.

As those skilled in the art understand, many host processors are programmed to provide data addresses in a form dictated by disk drive configurations that are now obsolete. Such outmoded disk drive configurations comprised relatively large diameter, storage disks that were addressed on the basis of a cylinder (i.e., tracks on a plurality of disks) and a read/write head (to designate a particular disk). Currently, in lieu of such large disk systems, the industry has migrated towards use of multiple small disk drive systems that are available on a commodity basis and, as a result, are inexpensive yet reliable.

To avoid having to re-program the host processors, storage systems using these small disk drives incorporate an address translation facility which converts the host data addresses (i.e., cylinder and head) to virtual storage volume addresses, such addresses defining physical addresses of disk systems that comprise the virtual storage volume. The virtual storage volume may be spread across many physical disk drives, with the virtual volume host addresses being related to physical disk addresses by a virtual volume directory. Thus, a storage system establishes virtual storage volumes which conform to the host addresses, even though such virtual storage volumes do not exist in reality, but rather exist in a distributed fashion across plural small disk drives.

As can thus be seen, data from a host processor can be spread across many disk drives and is thereafter only accessible by reference to an associated virtual volume directory. To, in effect, make a "copy" of data in a virtual volume, a copy or "snapshot" of a virtual volume directory is sometimes created, with each entry in the virtual volume directory comprising a pointer to a disk physical address which corresponds to a host-received virtual volume address.

A cost efficient data preservation technique employs the concept of transferring to a target virtual storage volume, a "snapshot" copy of a virtual storage volume directory that is to be mirrored. Such a directory transfer preferably occurs at predetermined intervals, i.e., not continuously. Such a snapshot action is facilitated by employing a log-structured file storage procedure. Such a procedure assures that writes of data updates to disk are never done in place. More specifically, when update data is written to disk, it is never overwritten on the old data, but rather is written to a new location. Accordingly, when a virtual storage volume directory configured as a log-structured array, is updated to reflect the location of the updated data, only the last entry in the directory which refers to the updated data is valid, even though the directory contains a prior entry indicating the previous location of the old data (which still remains on disk). Thus, when a virtual storage volume is updated, the entry designating the updated copy is written at the end of the log file. Until updated, other copies of the log-structured directory still include entries whose pointers point to the locations of the pre-update (i.e., old) data.

During creation of a snapshot copy of a directory of a virtual storage volume, access to the virtual storage volume is suspended until the snapshot operation is complete. Further, when the snapshot copy of the directory is transferred to a target virtual storage volume, the actual data which is pointed-to by the snapshot copy must be copied to the target virtual storage volume to assure its availability in the event of a failure of the originating virtual storage volume. Such copying of data can place a substantial processing burden on the initial virtual storage volume and can substantially reduce its availability to a host processor.

The prior art includes a number of teachings regarding enhancements of data mirroring actions. For instance, U.S. Pat. No. 5,592,618 to Micka et al. describes a data copy validation technique which compares primary data to a copy of that data by generating check codes of the data to be validated at both primary and secondary volumes in a data mirroring system. The validation session runs concurrently with the data mirroring so as not to disrupt the mirroring action.

U.S. Pat. No. 5,615,329 to Kern et al. describes a remote data mirroring system which provides real-time disaster recovery, wherein a secondary volume is located remotely from the primary volume. Upon a failure at the primary volume, an error recovery program is invoked and if successful, enables resumption of the duplex operation.

U.S. Pat. No. 5,504,861 to Crockett et al. discloses a remote data mirroring system wherein data updates are transmitted asynchronously from a primary volume to a secondary volume. The mirroring of data being updated is optimized by sorting the record updates according to secondary volume device storage locations and chaining pluralities of input/output control command words according to the sorted data updates. Further data mirroring/shadowing techniques can be found in the following U.S. Pat. Nos.: 5,623,599; 5,446,871 and 4,979,108.

Notwithstanding the aforementioned enhancements of data mirroring, such actions still place a substantial processing burden on the storage volume controller that implements the transfer of data being mirrored.

Accordingly, it is an object of this invention to provide an improved method and apparatus for achieving a remote mirroring of data, while relieving a primary virtual storage volume of certain processing overhead required during the mirroring action.

It is another object of this invention to provide a method and apparatus for achieving a mirroring operation in virtual storage volumes, wherein accessibility to a primary virtual volume is enhanced during the mirroring operation.

SUMMARY OF THE INVENTION

A data storage system includes at least first, second and third virtual storage volumes, the second and third virtual storage volumes being remotely coupled as a PPRC pair to enable a mirroring of data therebetween. The storage system is responsive to a snapshot command from a host processor, to cause transfer of the directory of the first virtual storage volume to the second virtual storage volume. The storage system then invokes a PPRC mirroring procedure which (i) detects an unsynchronized condition between the second and third virtual storage volumes (upon transfer of the directory from the first virtual storage volume to the second virtual storage volume), and (ii) causes a transfer of data, pointed to by the transferred directory, to the third virtual storage volume, until the second and third virtual storage volumes are again in synchronism. This action achieves a synchronization of the first and third virtual storage volumes, while the first virtual storage volume is relieved from processing overhead incident to transfer of data to the remotely located third virtual storage volume.

DETAILED DESCRIPTION OF THE INVENTION

Figure 1:
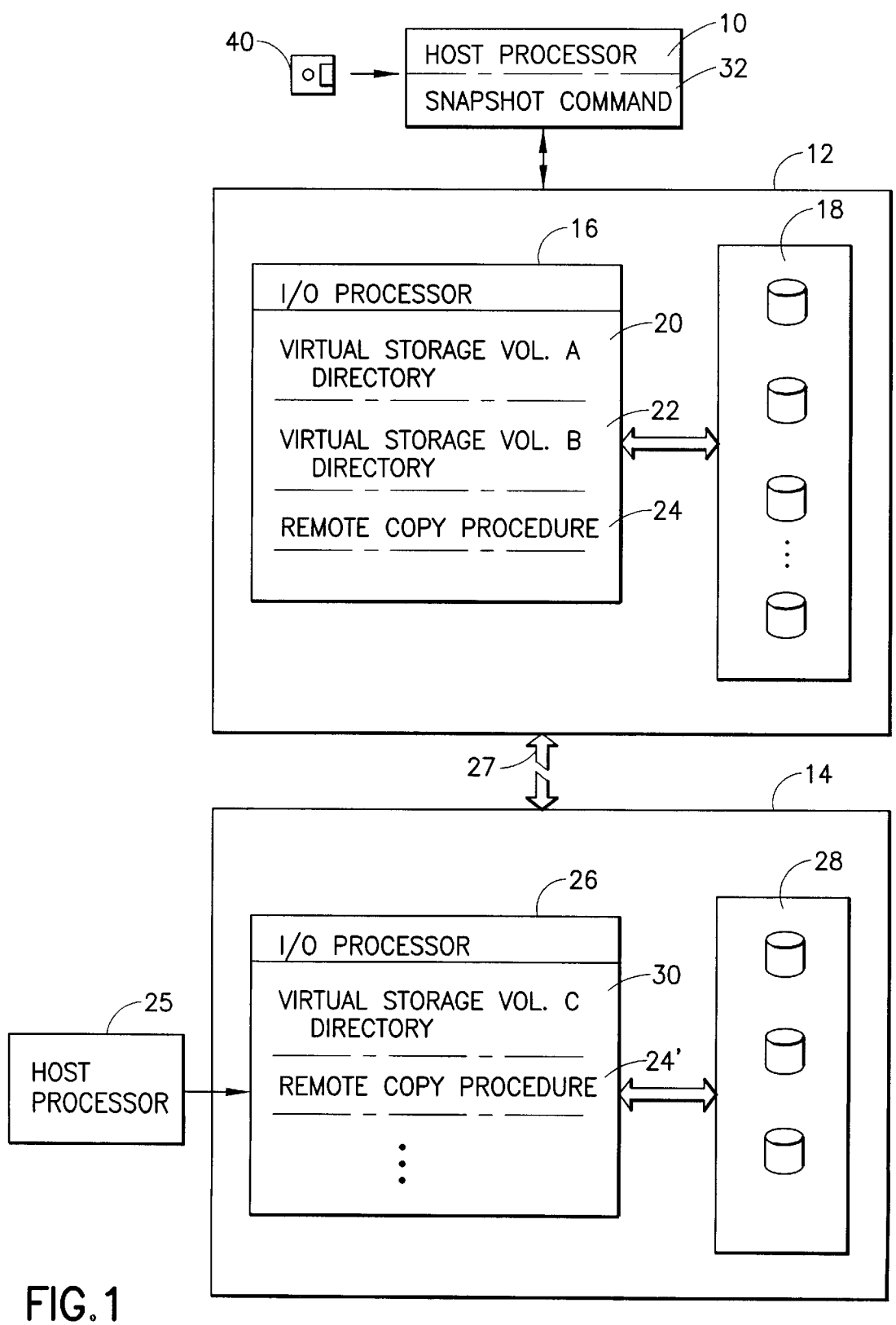
FIG. 1 is a block diagram of a data storage system particularly adapted to carrying out the invention hereof.

Referring to FIG. 1, a host processor 10 utilizes (i) data storage system 12 as a mass data storage facility and (ii) data storage system 14, which is located remotely from data storage system 12, as a data recovery facility (in the event of a failure of data storage system 12). Accordingly, a data mirroring procedure is periodically carried out between data storage systems 12 and 14 to assure a continued synchronism of their shared data. However, if data storage system 14 is located a distance away from data storage system 12 (e.g., 40 kilometers), data transfers between data storage systems 12 and 14 can place performance penalties on a virtual storage volume in storage system 12, due to the time it takes for data movements over the intervening distance between the systems. Such penalties reflect themselves back to host processor 10 in the form of longer periods of denied access to data storage system 12. This invention avoids such performance penalties which would otherwise result from data mirroring actions.

Data storage system 12 includes input/output processor 16 which controls transfer of data and commands to and from host processor 10. Data storage system 12 further includes a plurality of disk drive systems 18 which provide a mass storage facility for host processor 10. In addition to controlling data flow both into and out of disk drive systems 18, input/output processor 16 further includes a plurality of directories for virtual storage volumes that are spread across disk drive systems 18.

For the purposes of further describing the invention, it will be assumed that input/output processor 16 includes two directories, i.e., a virtual volume A directory 20 and a virtual volume B directory 22. Further, input/output processor 16 includes a remote copy procedure 24 which enables a mirroring of data stored in either of virtual volumes A or B to data storage system 14.

Data storage system 14 provides a mass storage facility for host processor 25 and, in addition provides a target virtual volume C wherein mirrored data from data storage system 12 can be stored via communication link 27. Data storage system 14 includes an input/output processor 26 which handles transfer of data and commands to and from input/output processor 16. Data storage system 14 further includes a plurality of disk drive systems 28, at least some of which are used to provide a storage facility for mirrored data from a virtual storage volume in data storage system 12. In that regards, it will be assumed that input/output processor 26 includes a directory 30 for virtual storage volume C that is spread across disk drive systems 28. Also contained within input/output processor 26 is a remote copy procedure 24 which operates in conjunction with remote copy procedure 24 to enable a mirroring of virtual storage volume data stored in data storage system 12.

The invention to be described below provides a significant performance improvement for a virtual storage volume whose data is to be copied to a remote storage system. Depending on the distance between the systems, a 20%–40% improvement may be expected. This is the result of the "off-loading" of the processing and data transfer overhead associated with the remote copy procedure. More specifically, once the transfer is complete of a directory of a virtual volume to a primary volume of a PPRC pair, the originating virtual volume becomes available for further accesses from the host processor. At such time, the PPRC pair handles the data transfers incident to the mirroring operation. It is to be understood that a directory just points to physical memory locations where the respective data is stored and is often not located in the same physical memory/disk system where the actual data is found.

It will be hereafter assumed that virtual storage volumes B and C are configured by remote copy procedure 24 as a PPRC pair. Accordingly, when remote copy procedure 24 senses a loss of synchronism between data stored in virtual storage volume B and that stored in virtual storage volume C, a re-synchronization procedure is automatically invoked. Such procedure may be carried out either intermittently or on a continuing basis.

A loss of synchronization between data stored in mirrored virtual storage volumes is determined by an examination of data in the "primary" virtual storage volume (i.e., the virtual storage volume whose data is being mirrored). More specifically, each data update to a virtual storage volume is marked with an update indicator (i.e., an "update" bit). Thereafter, when remote copy procedure 24 becomes active, it scans the primary virtual storage volume directory of a PPRC pair for any entry which manifests an update indicator and causes the data associated therewith to be transferred to the virtual storage volume which serves as the target data repository for the PPRC pair.

It is also assumed that a system supervisor wishes to maintain virtual storage volume A in a highest state of availability to host processor 10. Such a high availability state conflicts with the need to mirror the data contained within virtual storage volume A, as such mirroring (in the prior art) would dictate that virtual storage volume A be isolated from host processor 10 during the mirroring action. To avoid the need to isolate virtual storage volume A during a mirroring action, host processor 10 issues a snapshot command 32 to input/output processor 16.

Snapshot command 32 designates virtual storage volume B as the recipient of the data to be mirrored from virtual storage volume A. In response, input/output processor 16 creates a copy of virtual storage volume A directory 20 and inserts that directory into virtual storage volume B directory 22. At such time, each new entry in virtual storage volume B directory 22 is marked with an update indicator. Thereafter, remote copy procedure 24 sees each of the new entries from virtual storage volume A directory 20 that is marked with an update indicator and commences a data mirroring action. That action enables virtual storage volume C directory 30 to be re-synchronized with virtual storage volume B directory 22 and creates a mirrored copy of the data in virtual storage volume A in virtual storage volume C.

Figure 2A:
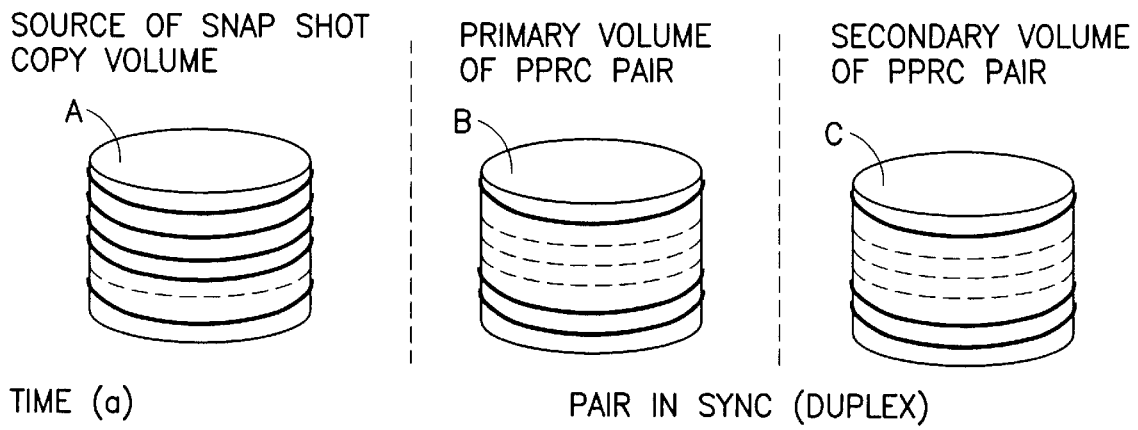
FIG. 2 is a schematic diagram illustrating the method of the invention.
Figure 2B:
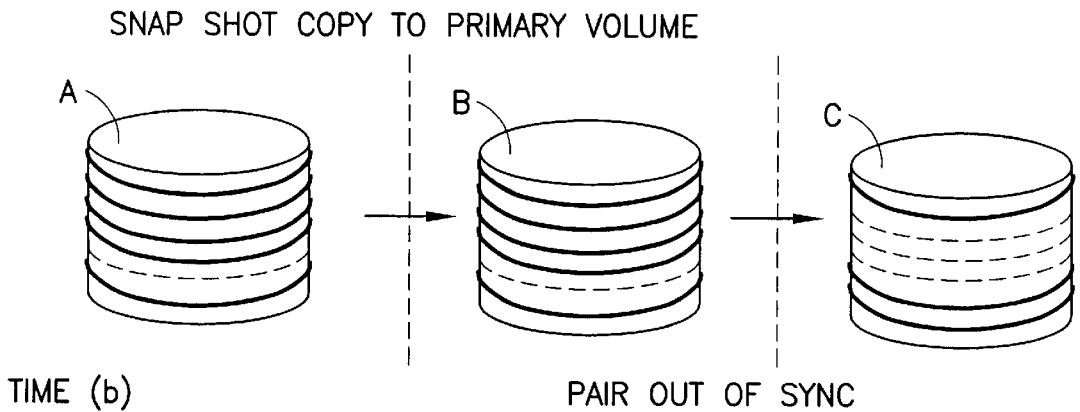
Figure 2C:
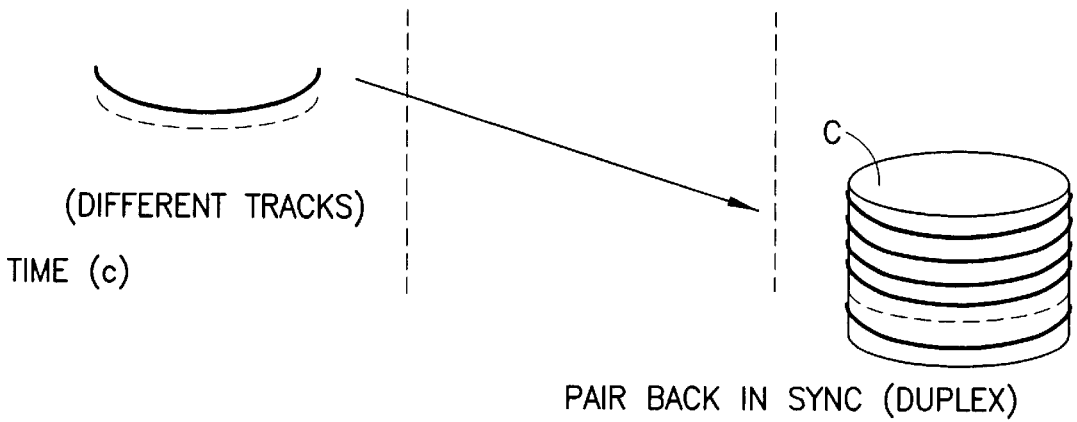
Figure 3:
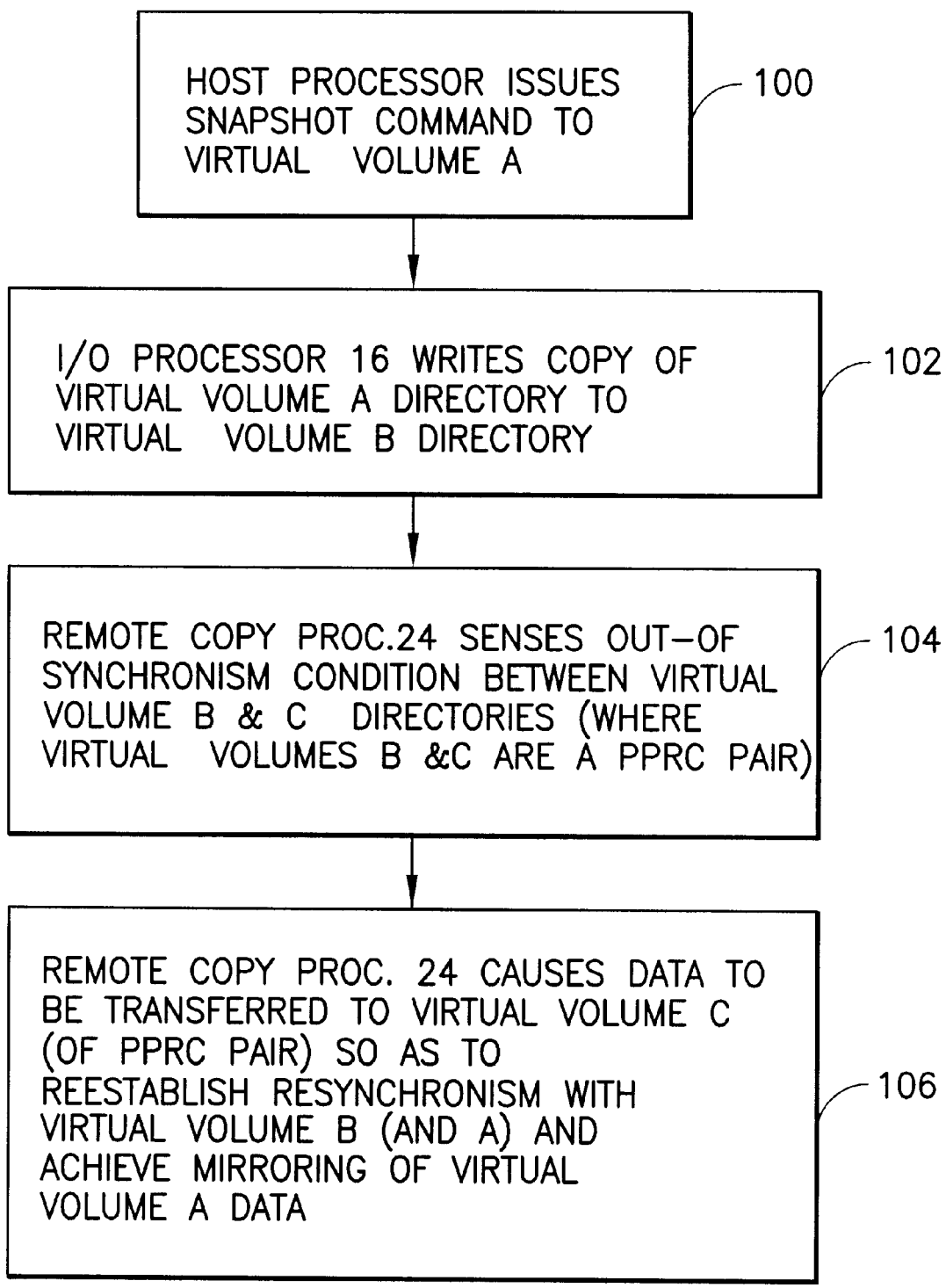
FIG. 3 is a logical flow diagram illustrating the method of the invention.

Referring to FIGS. 2a–2c, in conjunction with the logic flow diagram of FIG. 3, the invention will be further described. More precisely, to achieve a mirroring of data in virtual storage volume A, host processor 10 issues a snapshot command to copy the directory for virtual storage volume A to the directory of virtual storage volume B (step 100). Virtual storage volumes B and C are configured as a PPRC pair. In response to the snapshot command, a copy of the virtual storage volume A directory is transferred to the virtual storage volume B directory (step 102). Next, remote copy procedure 24 senses an asynchronous condition between virtual storage volumes B and C (step 104). Thereafter, remote copy procedure 24 causes the data that is marked with an update indicator in the virtual storage volume B directory to be transferred to virtual storage volume C (step 106), achieving a mirroring of the data in virtual volume A.

As can thus be seen, the procedure of the invention enables a copy to be created of data stored in a virtual storage volume that is being utilized by a host processor, without the performance penalty that would be incurred were the virtual storage volume, itself, to handle the mirroring action. More specifically, the invention makes use of an already existing remote copy procedure and a PPRC pair to accomplish the creation of mirrored entries corresponding to the virtual storage volume that has received the snapshot command.

It should be understood that the foregoing description is only illustrative of the invention. Various alternatives and modifications can be devised by those skilled in the art without departing from the invention. For example, a "complete" signal may be issued to the host processor when the transfer to a PPRC virtual volume of the virtual volume directory is accomplished. Such a signal indicates the availability of further accesses to the originating virtual volume by the host processor. Other protocols may also be used. Further, while the procedures required to execute the invention hereof are indicated as already loaded into memory of the storage subsystems, they may be configured on a storage media, such as data memory 40 in FIG. 1, for subsequent loading into the RAM of the controlling subsystem processors. Accordingly, the present invention is intended to embrace all such alternatives, modifications and variances which fall within the scope of the appended claims.

What is claimed is:

1. A data storage system including first storage means, second storage means and third storage means, said second storage means and third storage means being coupled to enable a mirroring of data therebetween, said storage system further comprising:

first processor means responsive to a command from a host processor, for transferring a directory of data from said first storage means to said second storage means; and second processor means coupled to said second storage means and including a mirroring procedure, said mirroring procedure (i) operative to detect an out-of-synchronism condition between said second storage means and said third storage means upon transfer of said directory of data from said first storage means to said second storage means, and (ii) for causing a transfer of data pointed to by said directory, to said third storage means to achieve a resynchronization between said second storage means and said third storage means, whereby data indicated by said directory from said first storage means is mirrored without need for said first storage means to interact with said third storage means during said mirroring.

2. The data storage system as recited in claim 1, wherein said second processor means appends out-of-synchronism indicators to entries in said directory of data, upon receipt thereof from said first storage means, said second processor means thereafter employing said out-of-synchronism indicators to determine which data is to be transferred to said third storage means by said mirroring procedure.

3. The data storage system as recited in claim 1, further comprising:

further storage means for storing said data pointed to by said directory, said further storage means storing both said update data and said old data in a log-structured arrangement so as to avoid said update data from being written over old data being updated.

4. The data storage system as recited in claim 1, wherein said second processor means is controlled by said mirroring procedure to inhibit accesses to said second storage means during said transfer to said third storage means of data pointed to by said directory, said first storage means thereby remaining available to said host processor during operation of said mirroring procedure.

5. The data storage system as recited in claim 1, wherein each of said first storage means, second storage means and third storage means is configured as a virtual storage volume.

6. A memory media including a program for controlling a data storage system, said data storage system including a primary processor means, a first storage volume and a second storage volume, and a mirror processor means and a mirror storage volume, said primary processor means and mirror processor means coupling said second storage volume and third storage volume to enable a mirroring of data therebetween, said memory media comprising:

a) means for operating said primary processor means to respond to a command to transfer a directory of data from said first storage volume to said second storage volume; and b) means for operating said primary processor means (i) to detect an out-of-synchronism condition between said second storage volume and said third storage volume upon transfer of said directory of data from said first storage volume to said second storage volume, and (ii) to cause a transfer of data pointed to by said directory, via said mirror processor means, to said third storage volume to achieve a resynchronization between said second storage volume and said third storage volume, whereby data indicated by said directory from said first storage volume is mirrored without need for said first storage volume to directly interact with said third storage volume during said mirroring.

7. The memory media as recited in claim 6, wherein means b) appends out-of-synchronism indicators to entries in said directory of data, upon receipt thereof, and thereafter employs said out-of-synchronism indicators to determine which data is to be transferred to said third storage volume.

8. The memory media as recited in claim 6, wherein means b) operates in conjunction with said mirroring procedure to inhibit accesses to said second storage volume during said transfer to said third storage volume of data pointed to by said directory, said first storage volume thereby remaining available to a host processor during operation of said mirroring procedure.

9. A method for controlling a data storage system, said data storage system including a primary processor means, a first storage volume and a second storage volume, and a mirror processor means and a mirror storage volume, said primary processor means and mirror processor means coupling said second storage volume and third storage volume to enable a mirroring of data therebetween, said method comprising the steps of:

a) operating said primary processor means to transfer a directory of data from said first storage volume to said second storage volume; and b) operating said primary processor means
   (i) to detect an out-of-synchronism condition between said second storage volume and said third storage volume upon transfer of said directory of data from said first storage volume to said second storage volume, and
   (ii) to transfer data pointed to by said directory, via said mirror processor means, to said third storage volume to achieve a resynchronization between said second storage volume and said third storage volume, whereby data indicated by said directory from said first storage volume is mirrored without need for said first storage volume to directly interact with said third storage volume during said mirroring.

10. The method as recited in claim 9, wherein step b) further includes the step of:

appending out-of-synchronism indicators to entries in said directory of data, upon receipt thereof, and thereafter employing said out-of-synchronism indicators to determine which data is to be transferred to said third storage volume.

11. The method as recited in claim 9, wherein step b) includes the further step of:

inhibiting accesses to said second storage volume during said transfer to said third storage volume of data pointed to by said directory, said first storage volume thereby remaining available to a host processor during operation of said mirroring procedure.

12. The method as recited in claim 9, wherein each of said first storage means, second storage means and third storage means is configured as a virtual storage volume.

* * * * *